Figures 4, 5:
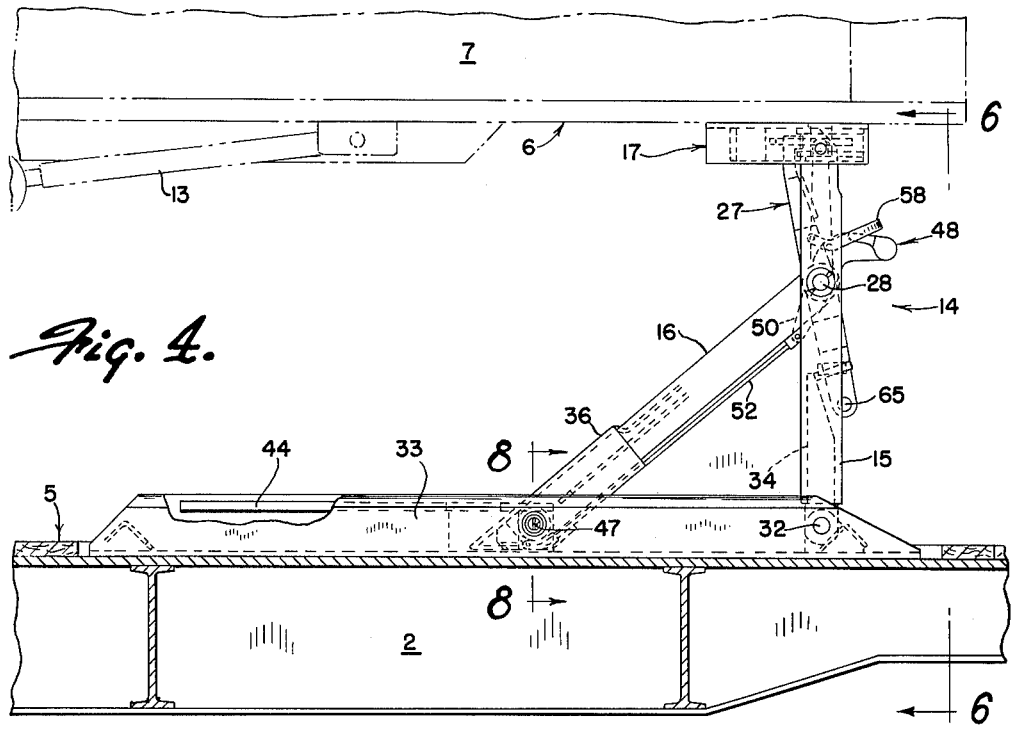

May 24, 1966     H. H. HARTZELL     3,252,432
PIGGYBACK TRAILER HITCH FOR RAILWAY CARS
Filed July 13, 1964     5 Sheets-Sheet 1
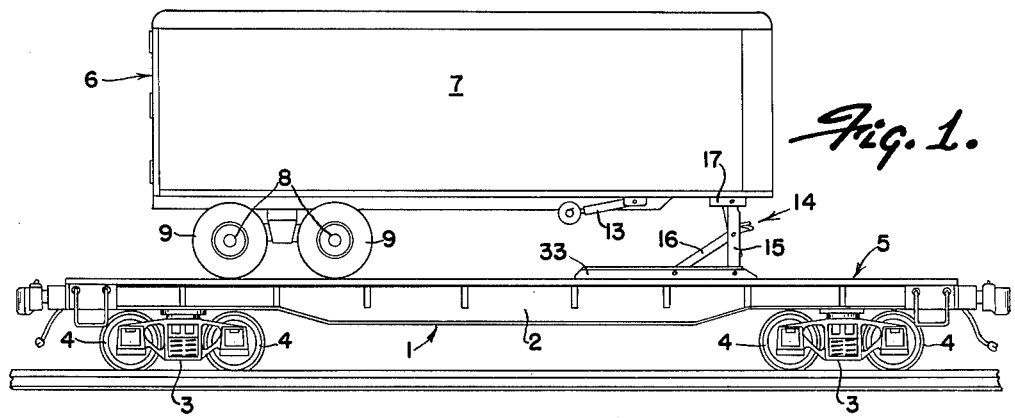
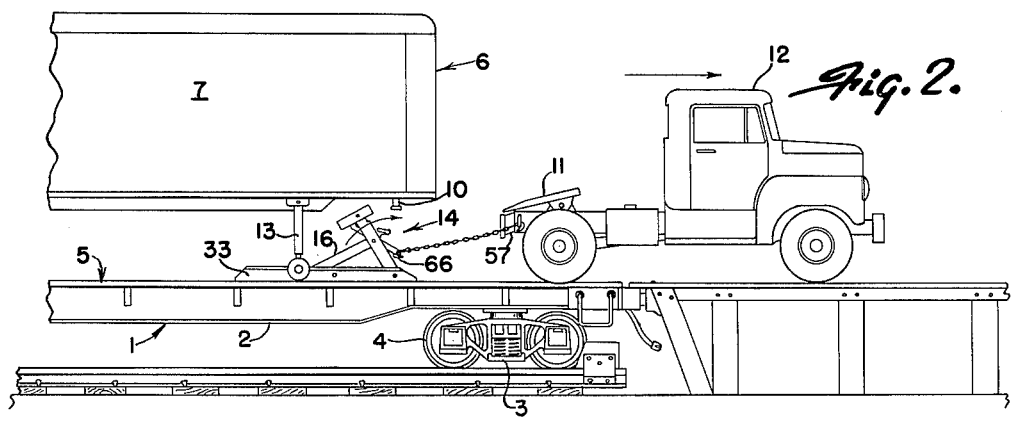
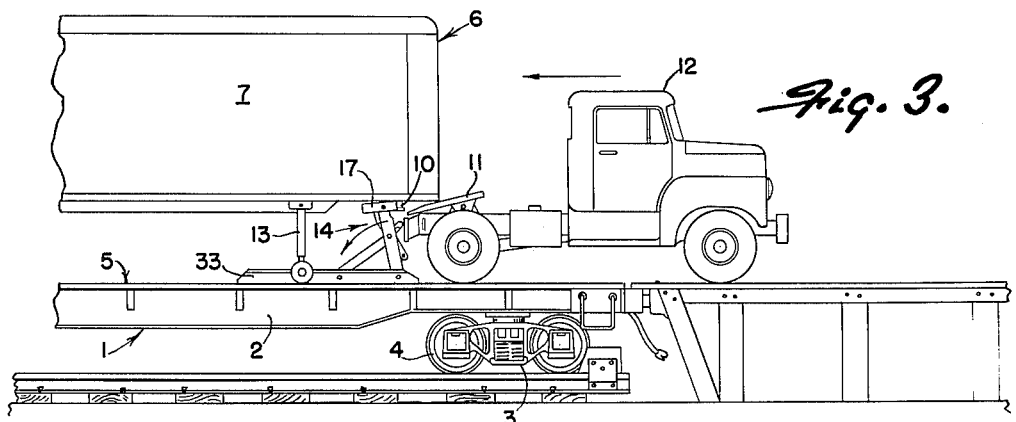
INVENTOR.
HERSCHELL H. HARTZELL
BY
Andrus & Starke
ATTORNEYS May 24, 1966 H. H. HARTZELL 3,252,432
PIGGYBACK TRAILER HITCH FOR RAILWAY CARS
Filed July 13, 1964 5 Sheets-Sheet 2

INVENTOR.
HERSCHELL H. HARTZELL
BY
Andrus & Starke
ATTORNEYS

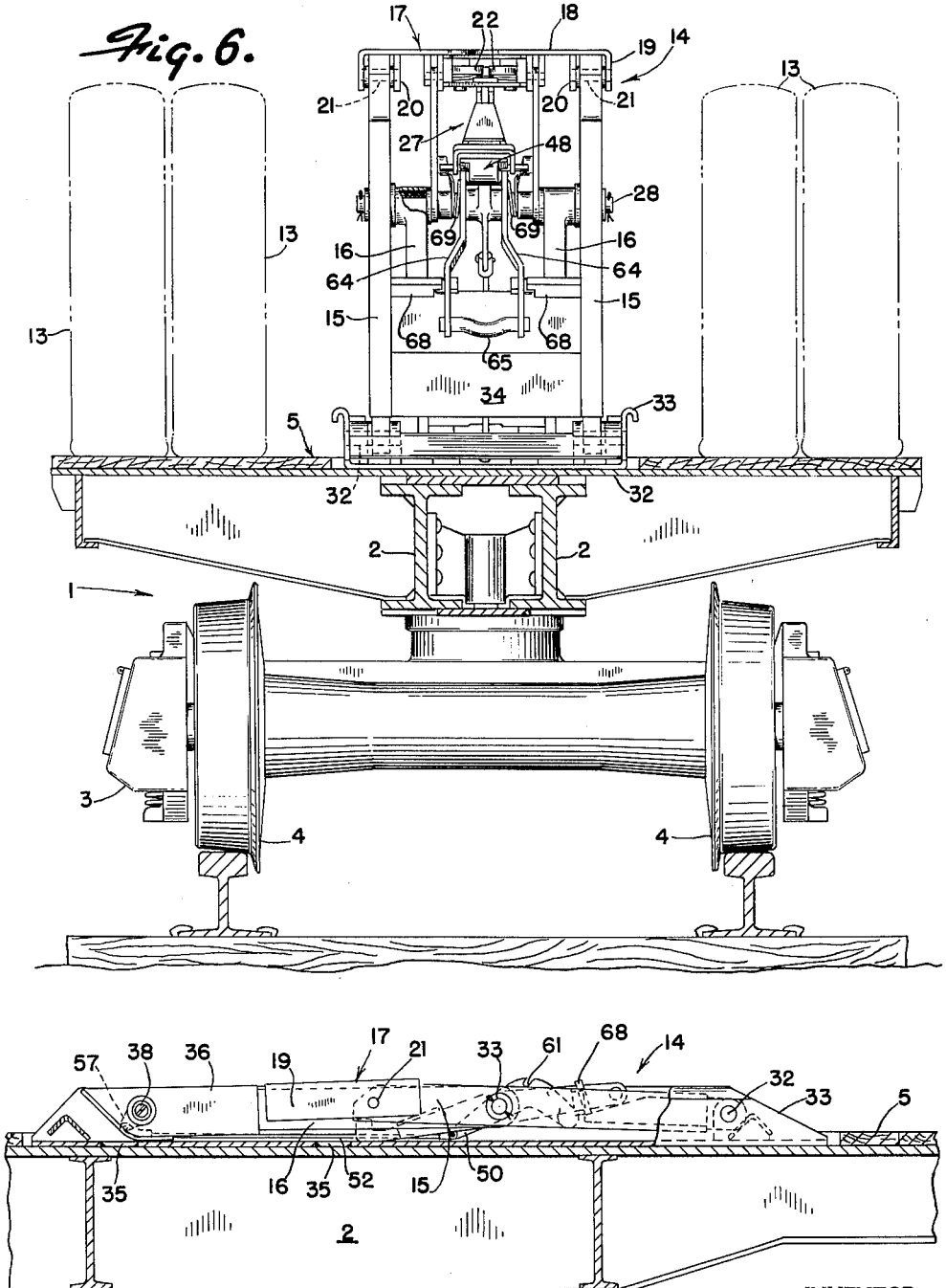

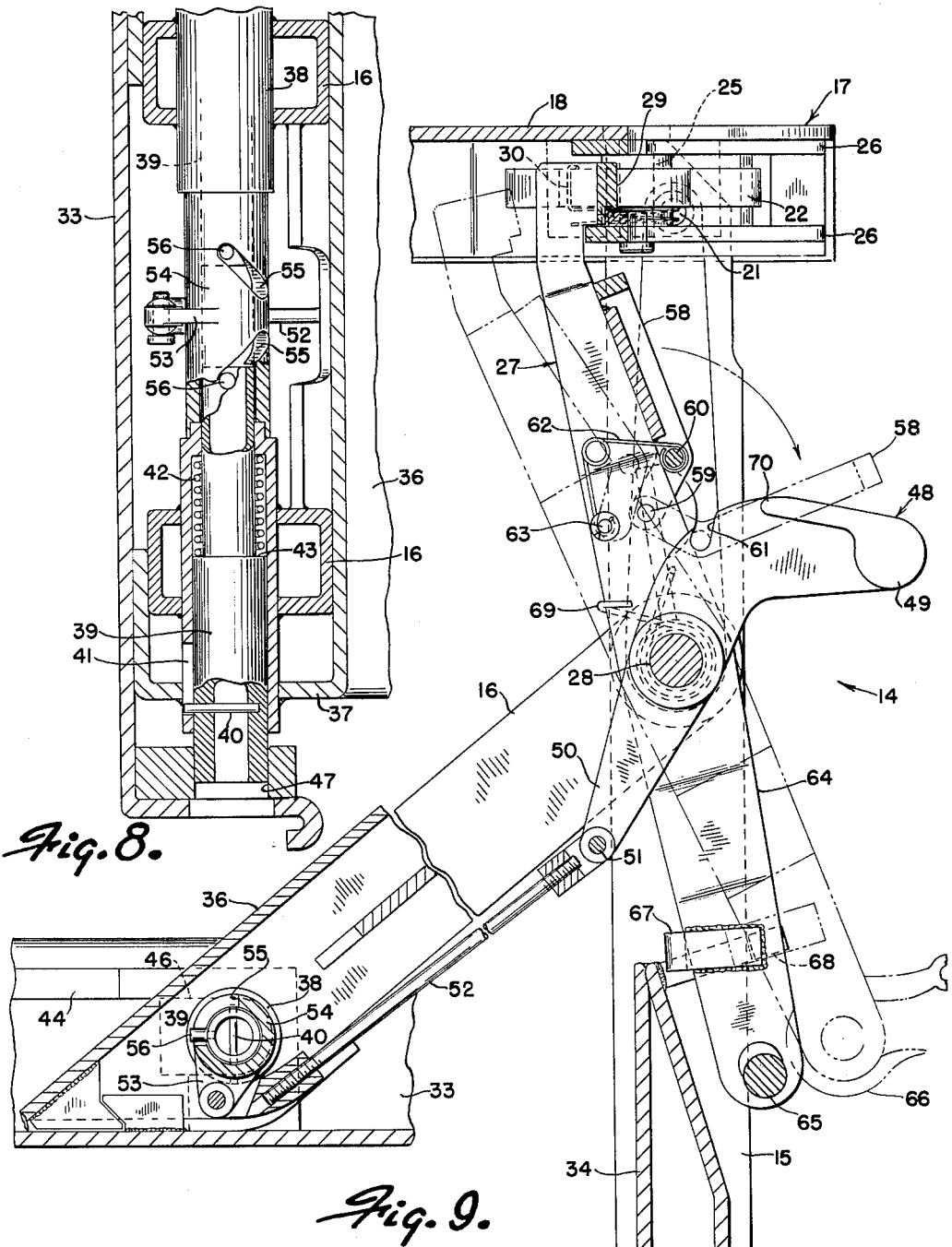

May 24, 1966 H. H. HARTZELL 3,252,432
PIGGYBACK TRAILER HITCH FOR RAILWAY CARS
Filed July 13, 1964 5 Sheets-Sheet 5

INVENTOR.
HERSCHELL H. HARTZELL
BY
Andrus & Starke
ATTORNEYS

United States Patent Office 3,252,432
Patented May 24, 1966

---

3,252,432
PIGGYBACK TRAILER HITCH FOR
RAILWAY CARS
Herschell H. Hartzell, Milwaukee, Wis., assignor to A. O.
Smith Corporation, Milwaukee, Wis., a corporation of
New York
Filed July 13, 1964, Ser. No. 382,210
5 Claims. (Cl. 105—368)

This invention relates to a trailer hitch for railway cars in the piggyback transport of cargo-carrying semitrailers and more particularly relates to a rigid, non-shock damping type of hitch.

A recent development in the transportation industry has involved the long distance hauling of cargo-carrying semitrailers by rail, this type of transportation being commonly referred to as the piggyback system. The semitrailers are initially pulled to the rail center over roadways by the usual tractor and may be loaded on the car by the tractor or crane as desired. At the other end of the line, the semitrailers are removed from the rail cars by a tractor or crane and are then pulled to the cargo destination point by the tractor. This system of transportation greatly facilitates and reduces the cost of long distance freight transportation while preserving the benefits of freight delivery by truck in allowing quick customized freight delivery at customer's plant, warehouse or the like.

To provide the transport of semitrailers or other vehicles in this manner, it is essential that the trailer be very firmly secured to the car during transit to resist the very substantial shock forces ordinarily imposed on railway cars in operation. Complex tie-down devices and anchoring means have been proposed heretofore and while these mechanisms have for the most part been functionally satisfactory they have for the most part required extensive reconstruction of the car with which they were employed. Also, the cost of certain of these prior art structures has been quite high and has required considerable time and labor to initially connect the trailer to the car and to subsequently detach the trailer for unloading purposes. As a result, the piggyback system of transport has not proven as inexpensive and facile as originally contemplated.

The present invention is directed broadly to the piggyback system of transporting cargo-laden vehicles, such as semitrailers, by railway rolling stock wherein a hitch for supporting the front end of the car-mounted semitrailer through its kingpin is retractible onto the deck of the car when not in use to permit unobstructed loading of the car. The invention is more particularly directed to a trailer hitch which may be erected and collapsed as required by a tractor employed in the hauling of semitrailers over a roadway.

The hitch is designed to be mounted on the deck of a regular flat car. A short car may require one hitch while a long car will require two hitches. The hitch collapses onto the deck of the car, and no well is required. The sides of the hitch base are provided with camming surfaces and the braces have axially slidable shafts adapted to engaging the camming surfaces during erection of the hitch. Openings are provided to cooperatively receive the slidable shafts when the hitch is erected to thereby lock the frame rigidly in place. A pivotal head is mounted to the frame and engages beneath the front end of the semitrailer when the hitch is in an uncollapsed erect position. Assembled within the head are locking dogs on vertical axes which close around the trailer kingpin to thereby secure the trailer to the car with the trailer supported on the erected hitch. An elevating lever handle is pivotally connected to the frame on a horizontal axis and is engaged by a hitch hook on the tractor whereby the hitch may be erected. The lever includes an inner end portion which enters between the locking dogs when the hitch is erected to positively hold the dogs around the kingpin. The other end of the lever handle is exposed for selective actuation thereof.

To enable quick and ready collapse of the hitch, a trip arm is pivotally mounted on the frame and connected by a rod to a pin and helix arrangement controlling axial displacement of the slidable shafts on the frame. The trip arm has a projection adapted to be engaged by a bumper plate on the tractor to cause the arm to rotate and disengage the shafts from locking position via the pin-helix mechanism. The supported weight of the trailer then effects an automatic collapse of the hitch. In addition, a safety lock mechanism is provided to prevent accidental rotation of the trip arm and unlocking of the hitch.

The proposed trailer hitch greatly simplifies the loading and unloading of road vehicles on railway cars and the like. The hitch is very simple to erect and collapse and provides a simple engagement around the kingpin of the trailer to effect the required rigidity of attachment to the car. The effort required to apply the hitch to a railway car is minimal.

The accompanying drawings illustrate the best mode presently contemplated by the inventor for carrying out the invention.

Figures 10, 11:
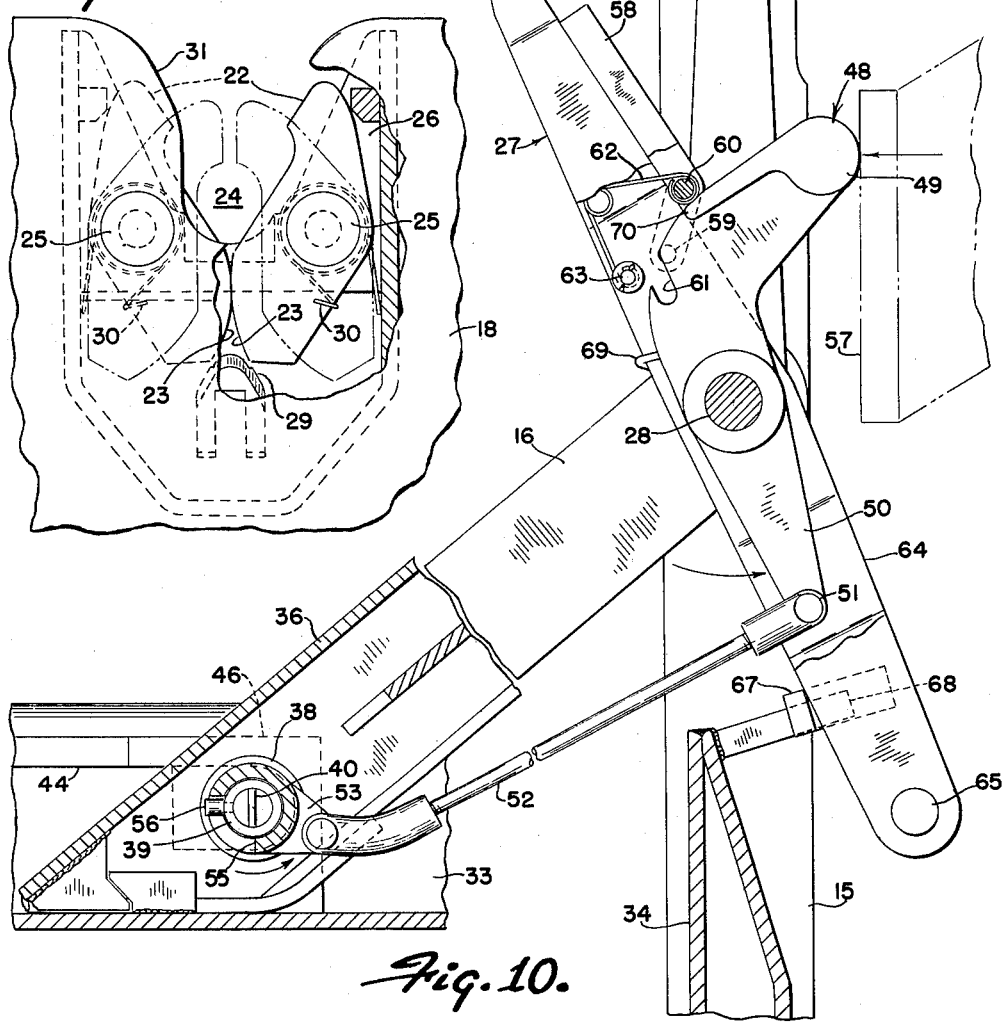

In the drawings:
FIGURE 1 is a side elevation of a semitrailer piggybacked on a railway car embodying the hitch of the invention;
FIG. 2 is a view similar to FIGURE 1 and showing the hitch being moved into its erected position;
FIG. 3 is a view similar to FIGURES 1 and 2 and showing the hitch being collapsed;
FIG. 4 is an enlarged fragmentary side elevation showing the hitch in raised position;
FIG. 5 is a top plan view of the erected hitch;
FIG. 6 is a front elevation of the erected hitch mounted on a railway car taken on line 6—6 of FIG. 4;
FIG. 7 is a side elevational view of the hitch in the retracted position;
FIG. 8 is a section taken on line 8—8 of FIG. 4 and showing the hitch locking and unlocking means;
FIG. 9 is a side elevation with parts broken away and in section and showing the hitch in erected position and with another position of the elevating lever shown in phantom;
FIG. 10 is a view similar to FIG. 9 and showing the tractor bumper plate engaging the trip arm; and
FIG. 11 is a top plan view with parts broken away of the kingpin engaging means.

Referring to the drawings, a railway car 1 incorporating the trailer hitch of the invention essentially comprises a longitudinally extending center sill 2 supported at opposite ends by a pair of trucks 3 which carry wheels 4 adapted to engage a railway track. Sill 2 and longitudinal side sills 2a support a flat car deck 5.

A cargo-carrying trailer 6 is adapted to be carried on car 1 and comprises a body 7 which is provided at its rear end with tandem axles 8 that, in turn, carry the dual road wheels 9. The front end of semitrailer 6 carries a kingpin 10 that is adapted to lockingly engage the fifth wheel 11 of a tractor 12 for transport of the trailer over a roadway. A landing gear 13 is provided adjacent kingpin 10 for supporting the semitrailer when tractor 12 is disassociated therewith. When semitrailer 6 is mounted upon the top of railway car 1, road wheels 9 directly engage deck 5 with the semitrailer 6 longitudinally centered on the car.

The front end of trailer 6 is supported on and secured to a hitch 14 mounted on deck 5 and constructed in accordance with the invention. While only one hitch is shown and described herein, it will be understood that there will be as many similar hitches as there are trailers to be transported. Hitch 14 has a skeletal frame, comprising a pair of laterally spaced main supports 15, a pair of laterally spaced braces 16 pivoted at one end to the midpositions of said supports and a trailer supporting head 17. As will be more fully explained hereinafter, hitch 14 is selectively movable between a retracted or storage position (FIG. 7) and an erected position (FIG. 4). When hitch 14 is in its collapsed position, it does not interfere with loading and unloading of semitrailer 6.

Considering now the construction of head 17 of hitch 14, a cap plate 18 extends across the top of the head and has downwardly extending end-walls 19 which cooperate with spaced downwardly extending flanges 20 which cooperate to receive the upper ends of supports 15 which receive pivot pins 21 therethrough. Plate 18 provides a seat for supporting the front end of semitrailer 6 when the front end thereof is held by the hitch. A kingpin locking mechanism is mounted in head 17 and includes a pair of opposed locking dogs 22 having rounded disposed facing edges 23 defining a kingpin access opening 24 therebetween. Dogs 22 are pivoted on the pivot pins 25 that extend between plate 18 and the respective horizontal portion of a pair of spaced brackets 26 disposed below the plate. Dogs 22 are locked in closed positions around kingpin 10 by a combination handle locking lever 27 pivoted centrally on a pivot shaft 28 extending between the upper ends of braces 16. The upper end of lever 27 is provided with a camming edge 29 adapted to enter between the rear portion of the dogs and hold the same in closed locked position. A spring 30 associated with each dog 22 and pin 25 biases the dogs towards a normal open or unlocked position. With camming edge 29 removed from between the dogs 22, the latter may pivot apart to release kingpin 10.

To insure entry of kingpin 10 between dogs 22 in connecting the trailer to the hitch, the front or leading edge of cap plate 18 is provided with a U-shaped center slot or notch 31.

Hitch 14 is adapted to be moved to the erected position from storage position by employing the tractor 12. For this purpose, the hitch supports 15 are pivoted at their lower ends on pivot stub shaft 32 mounted in the spaced vertical walls of hitch base 33. Supports 15 also carry a reinforcing crosspiece 34. The hitch is secured to the deck of the car by welding, utilizing welding slots 35 in the hitch base.

Pivot shaft 28 also pivotally carries the forward ends of braces 16 which are between supports 15 and lever 27.

The outer ends of braces 16 are interconnected by a cover plate 36 fitting over the ends of the braces. Channels 37 are welded to the ends of braces 16 and serve to support a pair of transverse bearing tubes 38. A pair of shafts 39 extend laterally through the end portions of braces 16 and channels 37 which support bearing tubes 38. Stub shafts 39 are telescopingly and slidably mounted within each bearing tube 38 and are adapted to ride on the sides of the hitch base 33 during the erection and retraction of the hitch. Stub shafts 39 are maintained in a predetermined rotational position within bearing tubes 38 by a pin 40 inserted diametrically through each shaft 39 and which is received within the diametrically located axial slots 41 in each end of bearing tube 38 whereby the stub shafts may slide axially of the latter. The stub shafts 39 are normally urged outwardly of the end of bearing tube 38 and into engagement with the corresponding sides of the hitch base by compression springs 42 housed in bearing tube 38 behind the step 43 of stub shaft 39.

The inner vertical surfaces of hitch base 33 each have an identical cam track 44 secured thereto for vertical retention of the respective stub shaft 39. Tracks 44 and stub shaft 39 coact to effect a positive locking of the hitch 15 in the erected position. Over the major portion of their length, the surfaces of the tracks 44 are flat and coplanar with respect to one another whereby during the initial phase of erecting the hitch, stub shafts 39 remain in substantially fixed axial relation in the respective ends of bearing tubes 38. As the hitch nears the erected position, that is, when main supports 15 approach vertical attitude, stub shafts 39 engage an inwardly merging angular cam surface 45 on each track 44 and are thereby forced axially inwardly against the outward bias of their respective springs 42. Beyond each surface 45 the track surfaces are again flat and parallel with respect to one another and are spaced from the vertical base flange further than the rearward surfaces. In this portion 46 of each of the tracks a laterally extending locking opening 47 is provided which extends through the track. Upon further raising of the hitch 14, stub shafts 39 eventually register with a corresponding opening 47 and the bias force of their respective springs 42 causes them to expandingly and lockingly enter the openings. The hitch is now in the fully erected position with supports 15 vertical and braces 16 extending diagonally from the supports to the deck 5.

The mechanism for unlocking the hitch to permit its movement back to the collapsed position includes a trip release arm 48 pivotally carried by the center of shaft 28. See FIG. 9. Arm 48 includes a forwardly extending nose portion 49 and a rearwardly extending lever 50. The latter is pivotally connected by a pivot pin 51 to an elongated rearwardly extending rod 52. The rear end of rod 52 is pivotally connected to a crank arm 53 secured to the midpoint of the under-side of a cam 54.

For purposes of unlocking the hitch, the rotatable cam 54 is provided with a pair of opposed helical cam slots 55. Cam slots 55 serve as guides for pins 56 disposed in the reduced inner end portions of the stub shafts 39 which extend through springs 42. Actuation of trip arm 48, as by a bumper plate 57 on tractor 12 will, through the linkage cause rotation of cam 54 in one direction whereby pins 56 will follow cam slots 55 in a converging retractible direction, causing withdrawal of shafts 39 from openings 47. This withdrawal motion, and the rotation of shafts 39 is limited by the inner ends of the slots 41 which serve as stops for pins 40.

After unlocking, hitch 14 may be moved to its collapsed position.

In raising and locking the hitch, when stub shafts 39 are forced into openings 47, since trip arm 48 is free, pins 56 will diverge and in following their respective cam slots 55 will cause cam 54 to rotate in the opposite direction and cause arm 48 to extend outwardly, due to the rod-crank connection.

Premature collapse of the hitch, as by accidental bumping of trip arm 48, is prevented by a U-shaped guard 58 which is pivoted about two similar shafts 59, each disposed on one of the two spaced arms 64 of lever 27. Guard 58 has a central cross bar 60 which is biased downwardly into a slot 61 in trip arm 48 by spring means 62 extending between shaft 60 and anchor pins 63 on the lever.

As indicated, lever 27 includes spaced segments 64 which diverge in a downward direction, and at the lower end is provided with a cross-piece 65 usable as a handle for lifting the hoist to an erect position.

The overall operation of the hitch will now be considered with reference to the loading of a trailer 6 upon the car 1. As previously noted, tractor 12 is employed in the loading of tractor 6.

In backing the trailer onto the car, hitch 14 is in its collapsed position and the trailer is initially positioned by the tractor so that the kingpin 10 is substantially in vertical alignment with the front of the hitch. With the trailer and hitch thus oriented, the trailer landing gear 13 is lowered and locked in place. The tractor is then uncoupled from the trailer.

With the hitch in collapsed position the elevating handle cross-piece 65 of lever 27 is forward and in exposed position. The rear of tractor 12 is equipped with a hitch hook 66 which is extendible to cross-piece 65.

The hitch hook 66 is then placed around cross-piece 65 whereupon the tractor is driven slowly forwardly, as in FIG. 2. As lever 27 is raised, lugs 67 thereon engage stops 68 attached to supports 15 to increase the mechanical advantage obtainable and restrict further rotation of lever 27 about pivot shaft 28. As this occurs, supports 15 and braces 16 are drawn forwardly and upwardly. During this movement, stub shafts 39 are actuated by the cam surfaces to move axially and at full hitch erection are brought into registry with openings 47 and thereupon enter therein to lock the hitch.

The head 17 tends to assume an angularly upwardly inclined position as the hitch is initially pulled forwardly. As the hitch approaches a fully erected position, the leading edge of the cap plate 18 engages the underside of the trailer and is thereby forced to a generally horizontal position. Dogs 22 then move around kingpin 10 and lock to it.

At this stage, the front end of the trailer is supported freely on head 17 with kingpin 10 between locking dogs 22. Hitch hook 66 is then disconnected from cross-piece 65 so that locking lever 27 may be returned by biasing springs 69 on shaft 28 to the position wherein camming edge 29 enters between dogs 22 to lock the kingpin to the hitch. The landing gear 13 on the front of the trailer may then be actuated to the raised position so that the erected hitch fully supports the trailer with the gear off the ground.

Cross bar 60 is then manually moved into slot 61.

The unloading of the semitrailer from the car is substantially the reverse of that described above and will be only briefly described herein. Initially, landing gear 13 is lowered and tractor 6 is backed up on car 1 at the front end of the trailer. Cross bar 60 is raised out of slot 61. The tractor bumper plate 57 engages nose 49 of arm 48 and causes lever 50 to turn on shaft 28 in a downward direction. This causes rod 52 and crank arm 53 to rotate cam 54 and results in pins 56 moving laterally inwardly of the shaft under the action of the helical slots 55 to effect the withdrawal of the stub shafts 39 from the openings 47.

As trip arm 48 raises, a pair of spaced shoulders 70 thereon engage the arms of lever 27 and force camming edge 29 out from engagement with the rear portion of dogs 22 to allow springs 30 to bias them to open position, thus releasing kingpin 10.

Hitch 14 under the supported weight of the trailer starts to collapse automatically and continues to do so under its own weight as the weight of the trailer is transferred to the landing gear. The tractor may then be backed up to connect with the kingpin to permit the trailer to be removed from the car.

Various modes of carrying out the invention are contemplated as being within the scope of the following claims particularly pointing out and distinctly claiming the subject matter which is regarded as the invention.

I claim:
1. For use with a railway car having a deck, a hitch for receiving and holding the kingpin of a vehicle mounted on the car, said hitch comprising:
  (a) a base adapted to be secured to said car deck, and with said base having spaced vertical walls,
  (b) a pair of laterally spaced supports pivotally mounted within said base,
  (c) a brace pivotally mounted at one end between the ends of each said support,
  (d) said supports and braces comprising a hitch frame disposable in a normally collapsed horizontal position within said base and pivotable to an uncollapsed erect position wherein the supports extend vertically above said base and the braces extend diagonally from said supports and downwardly to the base,
  (e) an axially expansible and retractible shaft extending laterally between and through the other ends of said braces,
  (f) means biasing said shaft toward an expanded condition whereby the ends thereof are disposed adjacent the said vertical walls of said base,
  (g) means providing lateral openings disposed to receive said shaft ends when the frame is in erect position and so that said biasing means causes said shaft to expand into the openings, said opening providing means comprising:
    (1) a longitudinal cam disposed along each of the opposing vertical walls of said base and with said cams adapted to have the ends of said shaft biased thereagainst and slid therealong,
    (2) each said cam having a first generally flat cam surface at the rearward end and which merges forwardly and laterally inwardly into a second generally flat cam surface spaced further from the respective vertical wall than said first surface,
    (3) the said lateral openings being disposed in said second flat cam surface,
  (h) and means to cause retraction of the shaft out of the openings.

2. For use with a railway car having a deck, a hitch for receiving and holding the kingpin of a vehicle mounted on the car, said hitch comprising:
  (a) a base adapted to be secured to said car deck, and with said base having spaced vertical walls,
  (b) a pair of laterally spaced supports pivotally mounted within said base,
  (c) a brace pivotally mounted at one end between the ends of each said support,
  (d) said supports and braces comprising a hitch frame disposable in a normally collapsed horizontal position within said base and pivotable to an uncollapsed erect position wherein the supports extend vertically above said base and the braces extend diagonally from said supports and downwardly to the base,
  (e) an axially expansible and retractible shaft extending laterally between and through the other ends of said braces, said shaft comprising:
    (1) hollow bearing tube means,
    (2) and a pair of axially movable stub shafts telescopingly disposed within said tube means,
  (f) means biasing said shaft toward an expanded condition whereby the ends thereof are disposed adjacent the said vertical walls of said base, said biasing means comprising a pair of springs mounted within said tube means and engaging the inner end portions of said respective stub shafts,
  (g) means providing lateral openings disposed to receive said shaft ends when the frame is in erect position and so that said biasing means causes said shaft to expand into the openings, said opening providing means comprising:
    (1) a longitudinal cam disposed along each of the opposing vertical walls of said base and adapted to have said stub shafts slide therealong,
    (2) each said cam having a first generally flat cam surface at the rearward end and which merges forwardly and laterally inwardly into a second generally flat cam surface spaced further from the respective vertical wall than said first surface,
    (3) the said lateral openings being disposed in said second flat cam surface,
  (h) and means to cause retraction of the shaft out of the openings.

3. For use with a railway car having a deck, a hitch for receiving and holding the kingpin of a vehicle mounted on the car, said hitch comprising:
 (a) a base adapted to be secured to said car deck, and with said base having spaced vertical walls,
 (b) a pair of laterally spaced supports pivotally mounted within said base,
 (c) a brace pivotally mounted at one end between the ends of each said support,
 (d) said supports and braces comprising a hitch frame disposable in a normally collapsed horizontal position within said base and pivotable to an uncollapsed erect position wherein the supports extend vertically above said base and the braces extend diagonally from said supports and downwardly to the base,
 (e) an axially expansible and retractible shaft extending laterally between and through the other ends of said braces, said shaft comprising:
  (1) hollow bearing tube means,
  (2) and a pair of axially movable stub shafts telescopingly disposed within said tube means,
 (f) means biasing said shaft toward an expanded condition whereby the ends thereof are disposed adjacent the said vertical walls of said base, said biasing means comprising a pair of springs mounted within said tube means and engaging the inner end portions of said respective stub shafts,
 (g) means providing lateral openings disposed to receive said shaft ends when the frame is in erect position and so that said biasing means causes said shaft to expand into the openings,
 (h) and means to cause retraction of the shaft out of the openings, said shaft retraction means comprising:
  (1) a trip arm pivotally mounted on a horizontal lateral axis between the said supports,
  (2) a cam rotatably mounted on said tube means,
  (3) a linkage connecting said trip arm to said cam,
  (4) said cam having a pair of opposed helical slots therein,
  (5) and a pin on the inner end portion of each said stub shaft and extending through the respective slot,
  (6) actuation of said trip arm causing rotation of said cam through said linkage so that said pins follow said helical grooves to move said stub shafts axially inwardly.

4. The apparatus of claim 3 which includes means to prevent accidental actuation of said trip arm, said means comprising:
 (a) a U-shaped guard pivoted on a horizontal lateral axis and spaced vertically from said trip arm,
 (b) said trip arm having a slot therein,
 (c) a cross bar on said guard and with said cross bar being movable into and out of engagement with said slot upon pivoting of said guard,
 (d) and spring means biasing said guard so that said cross bar is biased into said slot.

5. For use with a railway car having a deck, a hitch for receiving and holding the kingpin of a vehicle mounted on the car, said hitch comprising:
 (a) a base adapted to be secured to said deck and with said base having spaced vertical walls,
 (b) a pair of laterally spaced supports pivotally mounted at one end between said vertical walls,
 (c) a brace pivotally mounted at one end between the ends of each said support,
 (d) said supports and braces comprising a hitch frame disposable in a normally collapsed horizontal position between said walls and pivotable to an uncollapsed erect position wherein the supports extend vertically above said base and the braces extend diagonally downwardly from said supports to the base,
 (e) a head member secured to the upper end of said supports,
 (f) a pair of opposed dogs disposed beneath the upper portion of said head member and pivotally mounted thereto on central vertical axes, said dogs providing a pair of locking edges,
 (g) means biasing said dogs to an open position,
 (h) a lever pivotally mounted to said frame on a horizontal lateral axis with the outer end of said lever being exposed to permit selective actuation thereof and also serving as a handle for erecting said hitch,
 (i) a camming edge on the inner end of said lever and adapted to enter between the ends of said dogs removed from said locking edges to thereby lock the dogs in closed position,
 (j) a kingpin receiving slot in said head member and extending from one edge thereof to above said dogs so that as the kingpin enters said slot the kingpin will enter between said locking edges,
 (k) shaft means extending between and through the other ends of said braces and comprising:
  (1) a hollow tube portion,
  (2) and a pair of axially movable stub shafts telescopingly disposed within the ends of said tube portion,
 (l) a pair of springs mounted within said tube portion and engaging the inner end portions of the respective stub shafts to bias the latter outwardly,
 (m) a longitudinal cam disposed along each opposing vertical base wall and adapted to be engaged by said stub shafts,
 (n) each said cam having a forwardly disposed cam surface spaced from the respective vertical wall and having an opening adapted to receive the respective stub shaft to lock the hitch in erect position,
 (o) stub shaft retraction means comprising:
  (1) a trip arm pivotally mounted on a horizontal axis between said supports,
  (2) a cam rotatably mounted on said tube portion,
  (3) a linkage connecting said trip arm to said cam,
  (4) said cam having a pair of opposed helical slots therein,
  (5) and a pin on the inner end portion of each said stub shaft and extending through the respective slot,
  (6) actuation of said trip arm causing rotation of said cam through said linkage so that said pins follow said helical grooves to move said stub shafts axially inwardly and remove them from said openings,
 (p) and means to prevent accidental actuation of said trip arm, comprising:
  (1) a U-shaped guard pivoted on a horizontal lateral axis and spaced vertically from said trip arm,
  (2) said trip arm having a slot therein,
  (3) a cross bar on said guard and with said cross bar being movable into and out of engagement with slot upon pivoting of said guard,
  (4) and spring means biasing said guard so that said cross bar is biased into said slot.

References Cited by the Examiner
UNITED STATES PATENTS

| | | | |
|---|---|---|---|
| 3,041,028 | 6/1962 | McDowell | 248—119 |
| 3,050,320 | 8/1962 | Clejan | 105—368 |
| 3,142,466 | 7/1964 | Gutridge et al. | 248—119 |
| 3,164,346 | 1/1965 | Bateson | 248—119 |
| 3,168,878 | 2/1965 | Clejan | 105—368 |

ARTHUR L. LA POINT, *Primary Examiner.*

D. E. HOFFMAN, *Assistant Examiner.*